US006305011B1

(12) United States Patent
Safonov

(10) Patent No.: US 6,305,011 B1
(45) Date of Patent: *Oct. 16, 2001

(54) TIP TECHNOLOGY AND ITS APPLICATION TO SPARCOMPILER PASCAL

(75) Inventor: Vladimir Olegovich Safonov, St. Petersburg (RU)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/586,338

(22) Filed: Jan. 16, 1996

(51) Int. Cl.$^7$ .................................................. G06F 9/45
(52) U.S. Cl. .................................................. 717/5
(58) Field of Search .................. 395/705, 702, 395/703; 709/302, 328; 717/5, 2, 3

(56) References Cited

U.S. PATENT DOCUMENTS

| | | | | |
|---|---|---|---|---|
| 5,432,925 | * | 7/1995 | Abraham et al. | 395/500 |
| 5,432,942 | * | 7/1995 | Trainer | 395/700 |
| 5,675,801 | * | 10/1997 | Lindsey | 395/702 |
| 5,680,618 | * | 10/1997 | Freund | 395/616 |
| 5,701,490 | * | 12/1997 | Safonov | 395/705 |
| 5,758,163 | * | 5/1998 | Safonov | 395/708 |
| 5,845,289 | * | 12/1998 | Baumeister et al. | 707/103 |
| 5,892,951 | * | 4/1999 | Safonov | 395/708 |

FOREIGN PATENT DOCUMENTS 0372-834 A3   11/1989   (EP)   ................ G06F/9/455

OTHER PUBLICATIONS

S. Graupner, et al, "Adaptable Infrastructures for Operating Systems", IEEE, pp. 162–165, Aug. 1995.*
K. Maruyama, "A Concurrent Object–Oriented Switching Program in Chill", IEEE, pp. 60–68, Jan. 1991.*
Y. Omori, et al, "A Parallelizing Compiler by Object Oriented Design", IEEE, pp. 232–239, Jul. 1997.*
J. Holmes, Object–Oriented Compiler Construction, Prentice Hall, sections 2.3, Nov. 1994.*
Booch, Object Oriented Analysis and Design, Benjamin Cummings, p. 48–50,88–89,479–480, Dec. 1994.*
Aho et al, Principals of Compiler Design, Addison–Wesley, p. 229–230, Apr. 1979.*
Vladimir Olegovich Safonov, Programming Languages and Techniques for the Elbrus System, Moscow, Nauka Publishers (1989–in Russian).

* cited by examiner

Primary Examiner—Majid Banankhah
Assistant Examiner—Sue Lao
(74) Attorney, Agent, or Firm—Squire, Sanders & Dempsey, L.L.P.

(57) ABSTRACT

A method and apparatus for mandating a hierarchy of TIPs (Technological Instrumental Packages), each defining an interface for handling a related data structure, such as a symbol table or a parse tree. The present invention structures a TIP into a plurality of abstract levels, which include an encapsulated concrete representation, a representation level, a definition level, and a conceptual level. The interface to a TIP consists of, for example, the conceptual level and a portion of the definition level. The concrete representation and representation level are hidden from the computer programmer. In addition, the present invention designates an interface for each level to perform creation/deletion, access, update, and output.

21 Claims, 4 Drawing Sheets

TIP TECHNOLOGY AND ITS APPLICATION TO SPARCOMPILER PASCAL

RELATED APPLICATIONS

The following applications, which are filed concurrently herewith, are related to the subject application, and are expressly incorporated by reference.

1) Application Ser. No. 95,118,249 of Vladimir O. Safonov entitled "Method and Apparatus for Efficient Evaluation of Semantic attributes in LALR Parsing."

2) Application Ser. No. 95,118,250 of Vladimir O. Safonov entitled "Method and Apparatus for Compiler Symbol Table Organization With No Lookup in Semantic Analysis."

3) Application Ser. No. 95,118,820 of Vladimir O. Safonov entitled "Method and Apparatus for Records Fields Usage Checking at Compile Time."

BACKGROUND OF THE INVENTION

This application relates to a compiler and, specifically, to the maintenance and design of a compiler for a high level computer programming language.

A compiler is a computer program that translates a "source program" written in a high level computer programming language that is easily understood by human beings into a "target program" executable by a computer. Typically, a compiler includes several functional parts. For example, a conventional compiler may include a lexical analyzer that looks at the source program and identifies successive "tokens" in the source program.

A conventional compiler also includes a parser/syntactical analyzer, which takes as an input a grammar defining the language being compiled and a series of actions associated with respective production of the grammar. The parser builds a "parse tree" for the statements in the source program in accordance with the grammar productions and actions. For each statement in the input source program, the parser generates a parse tree of the source input in a recursive, "bottom-up" manner in accordance with relevant productions and actions. Thus, the parse tree is formed of nodes corresponding to one or more grammar productions. Generation of the parse tree allows the parser to determine whether the parts of the source program comply with the grammar. If not, the parser generates an error. Thus, the parser performs syntactical checking, but does not conventionally check the meaning (the "semantics") of the source program. One example of a conventional parsing technique is a LALR (lookahead, left right) parser, which is described in Chapter 4 of the treatise "Compilers: Principles, Techniques and Tools" by Aho, Sethi, and Ullman, the entirety of which is hereby incorporated by reference.

In conventional compilers, after the source program is parsed, it is input to a semantic analyzer, which checks for semantic errors, such as the mismatching of types, etc. The semantic analyzer evaluates, for example, "semantic attributes" of nodes of the parse tree. Attributes that are evaluated by looking at the attributes of their child nodes are called "synthesized attributes." After parsing and semantic analysis, the compiler generates intermediate code, optimizes the intermediate code and generates a target program.

The source program of a compiler software program itself is quite large and complex. Many different people usually work on the source code of a compiler during the compiler's useful life. Thus, different people with different coding styles, some good and some bad, contribute to the source code of a compiler. Even if every programmer contributing to the source code of a compiler uses good programming practices (which is unlikely) individual programming style vary and most compilers are written in a variety of coding styles. It is important that the source code for a compiler be easy to update and to maintain.

To this end, it is important to standardize the modules of the source program and to standardize the interfaces between modules. Earlier efforts to standardize coding practices include ADT (Abstract Data Types) and OOP (object oriented programming) methodologies.

SUMMARY OF THE INVENTION

The present invention overcomes the problems and disadvantages of the prior art by mandating a hierarchy of TIPs (Technological Instrumental Packages) in the design of a compiler. Each TIP defines an interface for handling a related data structure, such as a symbol table or a parse tree. The present invention structures a TIP into a plurality of abstract levels, which include an "encapsulated concrete representation," a "representation level," a "definition level," and a "conceptual level." The interface to a TIP consists of, for example, the conceptual level and a portion of the definition level. The concrete representation and representation level are hidden from the computer programmer. In addition, the present invention designates an interface on each level to perform creation/deletion, access, update, and output.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

Figure 1:
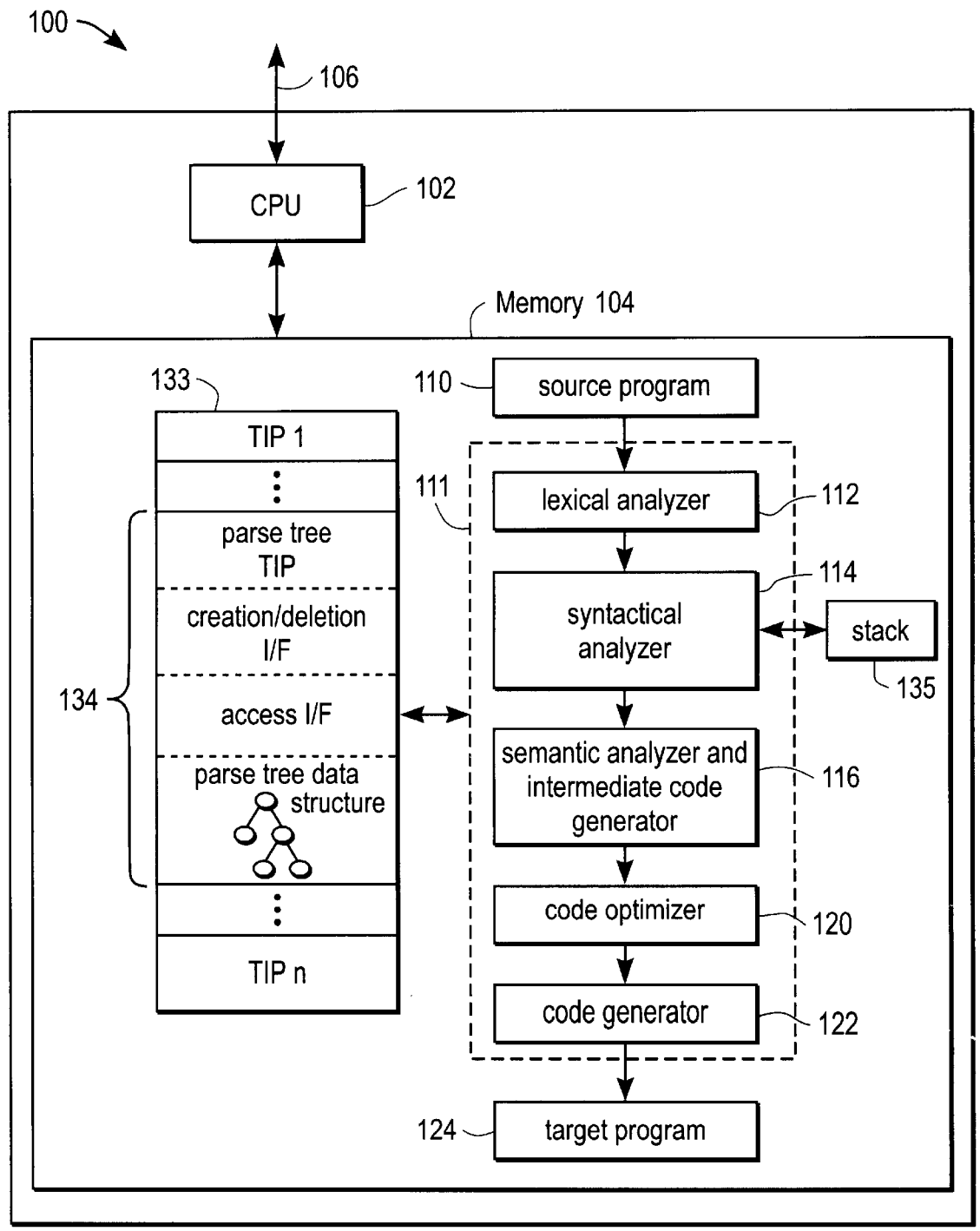
FIG. 1 is a block diagram of a computer system in accordance with a preferred embodiment of the present invention.

The present invention is an apparatus and method for improving reliability, maintainability, and readability in software. FIG. 1 is a block diagram of a computer system 100 in accordance with the present invention. Computer system 100 includes a CPU 102, a memory 104, and input/output lines 106. It will be understood by persons of ordinary skill in the art that computer system 100 can also include numerous elements not shown in the Figure for the sake of clarity, such as disk drives, keyboards, display devices, network connections, additional memory busses, additional CPUs, etc.

Memory 104 includes a source program 110, a compiler 111, and a target program 124. Compiler 111 includes a lexical analyzer 112, a syntactical analyzer 114, a semantic analyzer 116, a code optimizer 120 (optional), and a code generator 122. Compiler 111 inputs source program 110 and processes the source program to output target program 124. Compiler elements 112–116 operate for each statement in source program 110 to generate intermediate code. Memory 104 also includes a plurality of TIPs (Technological Instrumental Packages) 133, as described below. Certain portions of the compiler (e.g., the parse tree interface) are organized (or structured) as a hierarchy of TIPs. TIPs in the described Pascal compiler do not contain data. TIPs are structured pieces of software that handle some global data (and refer to these data). In other embodiments, however, it is possible to design and code TIPs in such a way that these be able to handle not these specific data only (e.g., one concrete namelist table NL, one parse tree, etc.) but ANY data which are passed to functions of these TIPs as parameters.

As will be understood by a person of ordinary skill in the art, all parts of compiler 111 are embodied as instructions stored in memory 104 and performed by CPU 102. Syntactical analyzer 114 accesses a parser stack 135. Syntactical analyzer 114 uses a grammar which includes productions and associated actions corresponding to the productions. The actions of the grammar access TIPs 133, including parse tree TIP 134, by using a plurality of interface functions in the TIPS.

Semantic analyzer 116 traverses the parse tree of parse tree TIP 134 for the entire source program (or for a large part of the source program) created by syntactical analyzer 114 and recursively traverses the tree, calling appropriate semantic analysis routines.

Semantic analyzer 116 prints error messages and/or halts execution if semantic errors are found. If no semantic errors are found, semantic analyzer 116 outputs PCC trees in a manner known to persons of ordinary skill in the art. Intermediate code generator 116 translates the PCC trees into a front-end representation in a manner known to persons of ordinary skill in the art (e.g., Aho et al., "Compilers, Principles, Techniques and Tools," pp. 735–737). Code optimizer 120 (optional) optimizes this representation and outputs the front-representation in optimized form (for example, unused code fragments may be deleted). Code generator 122 preferably translates the front-end representation into target program 124 in a manner known to persons of ordinary skill in the art.

A preferred embodiment of the present invention is the SPARCpascal compiler for the pascal programming language. The compiler itself is preferably written in the C programming language and executes under the Solaris operating system, which is available from Sun Microsystems and related to the Unix operating system. Solaris is a trademark of Sun Microsystems. The SPARC trademarks are trademarks of SPARC International, Inc. Unix is a registered trademark in the United States and other countries, exclusively licensed through X/Open Company, Ltd.

Figure 4:
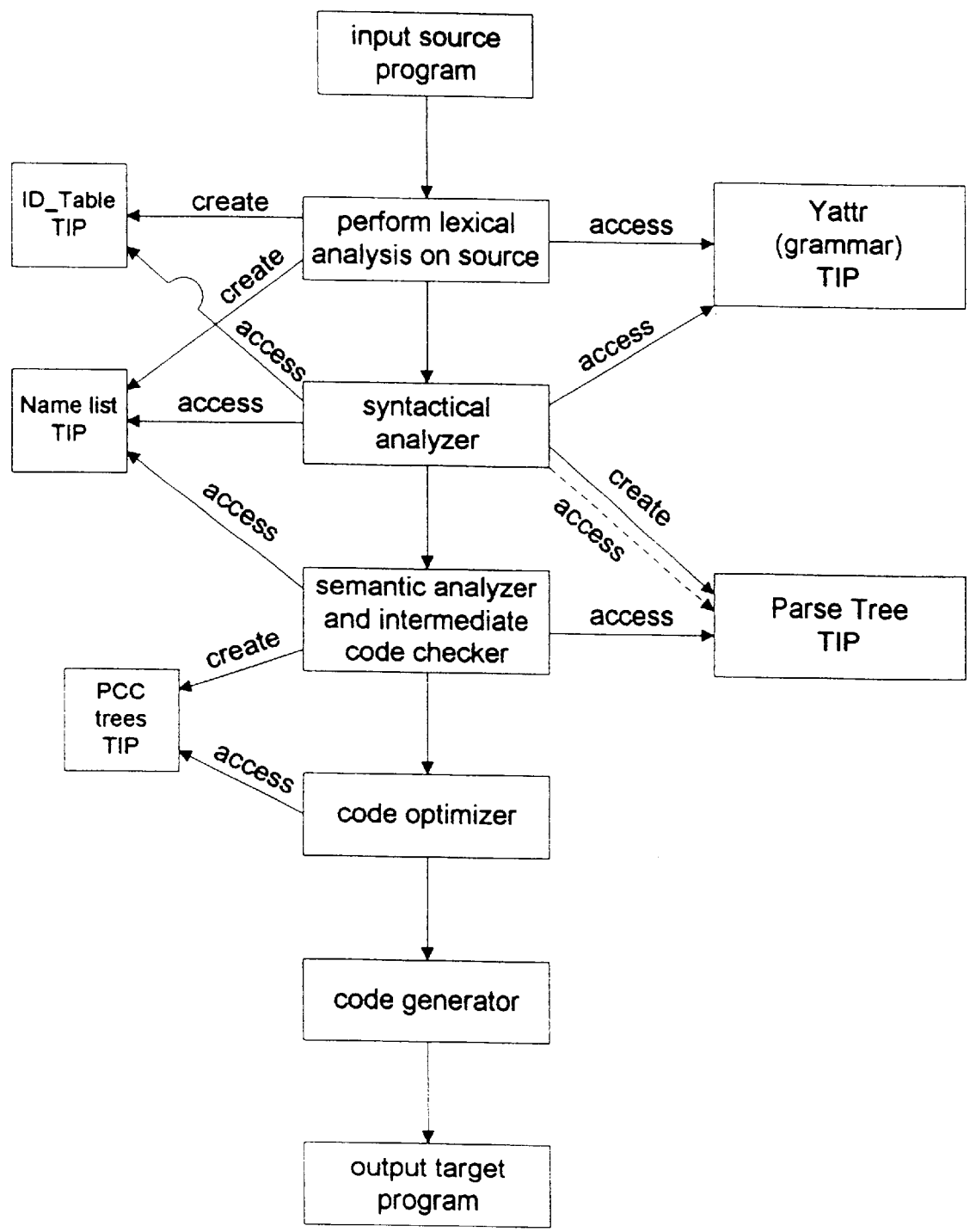
FIG. 4 is a flow chart showing, modules of a compiler creating and accessing data structures in various TIPs.

As shown in FIG. 4, TIPs are used for an identifier table, a name list table, a parse tree, an interface called, e.g., YATTR, that defines specific semantic actions for a pascal yacc grammar, and PCC trees. The identifier table and name list (NL) table (also called a symbol table) are both described in application Ser. No. 95,118,250, entitled "Apparatus and Method for Compiler Symbol Table Organization With No Lookup in Semantic Analysis" of V. O. Safonov, filed concurrently herewith. A parse tree is described in application Ser. No. 95,118,249, entitled "Method and Apparatus for Efficient Evaluation of Semantic Attributes in LAIR Parsing" of V. O. Safonov, filed concurrently herewith. Yattr is an interface of semantic actions for a conventional yacc grammar defining, e.g., the pascal programming language. PCC trees are described in, e.g., Aho et al., "Compilers, Principles, Techniques and Tools," pp. 735–737. Other embodiments of the invention use TIPs for other appropriate data structures.

Figure 2:
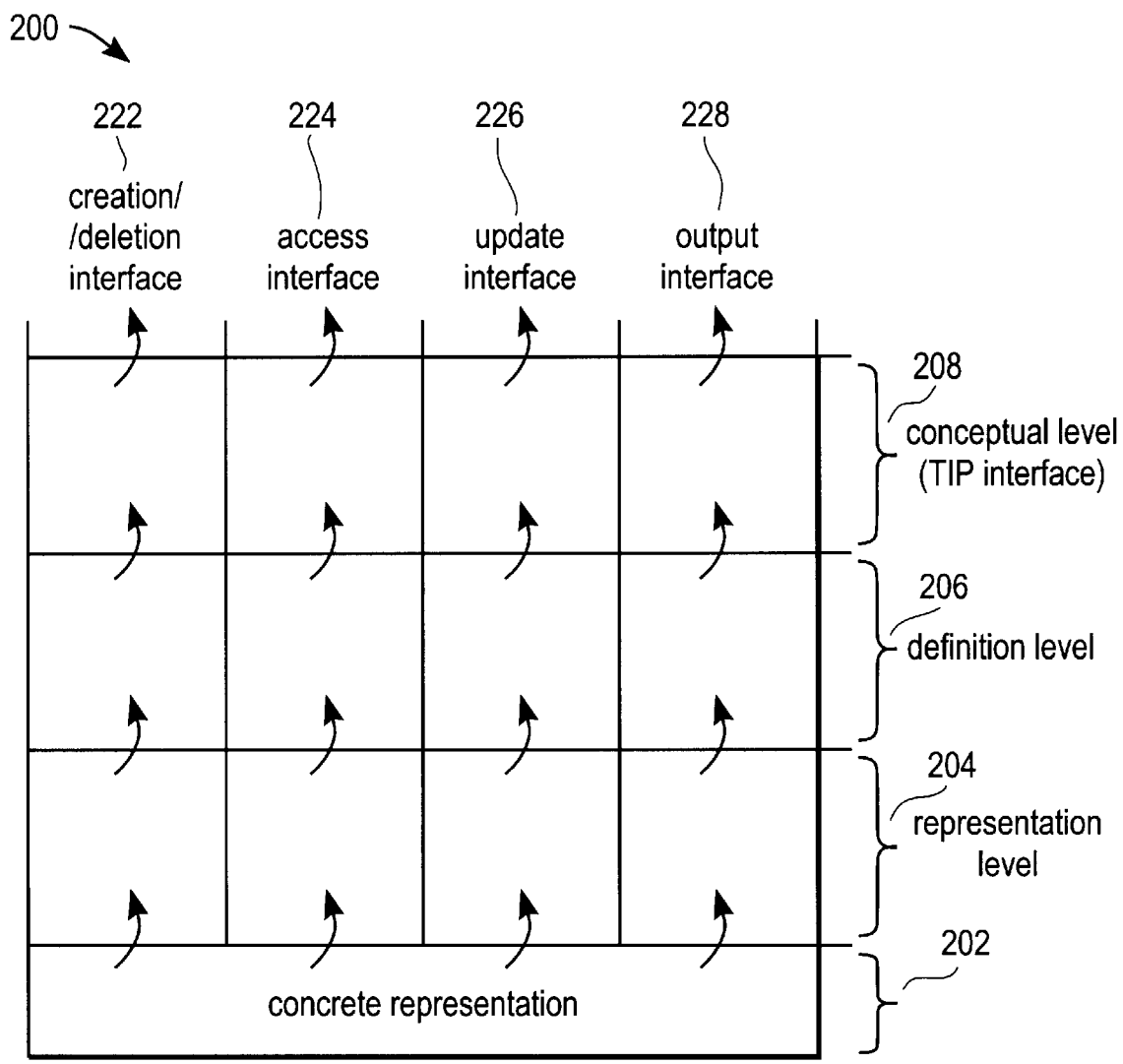
FIG. 2 is a conceptual diagram of the structure of a TIP.

FIG. 2 is a conceptual diagram of the structure of a TIP 200. After the conceptual model is discussed, an example of a TIP is given below. As shown in FIG. 2, each TIP defines a public interface for handling a related data structure, such as a symbol table or a parse tree. As shown in FIG. 2, TIP 200 is structured into a plurality of abstract levels, which include an encapsulated concrete representation 202, a representation level 204, a definition level 206, and a conceptual level 208. Each of these abstract levels is represented by a horizontal row in FIG. 2.

The present invention designates a group of interface routines for each level to perform creation/deletion 222, access 224, update 226, and output 228 (each of which is represented by a column in FIG. 2). The interfaces of concrete representation 202 and of representation level 204 are hidden from the computer programmer. The conceptual level 208 interface comprises a plurality of software procedures or functions that make up the interfaces through which the TIP can be accessed by software outside the TIP. An available interface to a TIP may also include a portion of definition level 206. At other times, definition level 206 is hidden. A simple example follows.

If, for example, a TIP for list handling is being designed, its definition level may contain the following operations (abstract attributes) for each list entry L: INFO(L), which is the informational part, KEY(L), which is the key for associative search, and NEXT(L), which is the pointer to the next list entry. The INFO and KEY attributes may be included into the interface of the TIP. But it is not necessary to include the NEXT attribute in the interface because at the conceptual (higher) level we can design an iterator ELEMENTS(L, P) which scans all the entries of the list. So, the NEXT attribute remains hidden.

Thus, the example TIP of FIG. 2 has four groups of interfaces, a top level of which is available to software performing operations on the data structure to which the TIP corresponds, and lower levels of which are used internally to the TIP for access between the various levels of interfaces. As shown by the arrows in FIG. 2, a level N interface can be accessed at level N+1 only. It is also allowed (but rarely happens) for level N routines to use other level N routines. Not all TIPs will include each of the interfaces shown in FIG. 2, but if such interfaces are needed, they will conform to the format of FIG. 2.

Encapsulated concrete representation 202 is an actual data structure stored in memory, such as a parse tree, a symbol table (NL table), an identifier table, or a data structure representing a conventional grammar for a programming language. The actual representation of such a data structure is not a part of the present invention and any appropriate data structure may be used. Representation level 204 includes a plurality of operations, e.g., creation/deletion 222, access 224, update 226, and output 228, defining access to attributes/elements of concrete representation 202. Definition level 206 includes a plurality of operations, e.g., creation/deletion 222, access 224, update 226, and output 228, defining access to abstract attributes in representation level 204, which may or may not strictly correspond to the concrete attributes/elements. "Abstract attributes" are also called "intermediate abstract concepts." Conceptual level 208 includes more general operations (e.g., iterators) that treat the data structure as a single abstract object.

Figure 3:
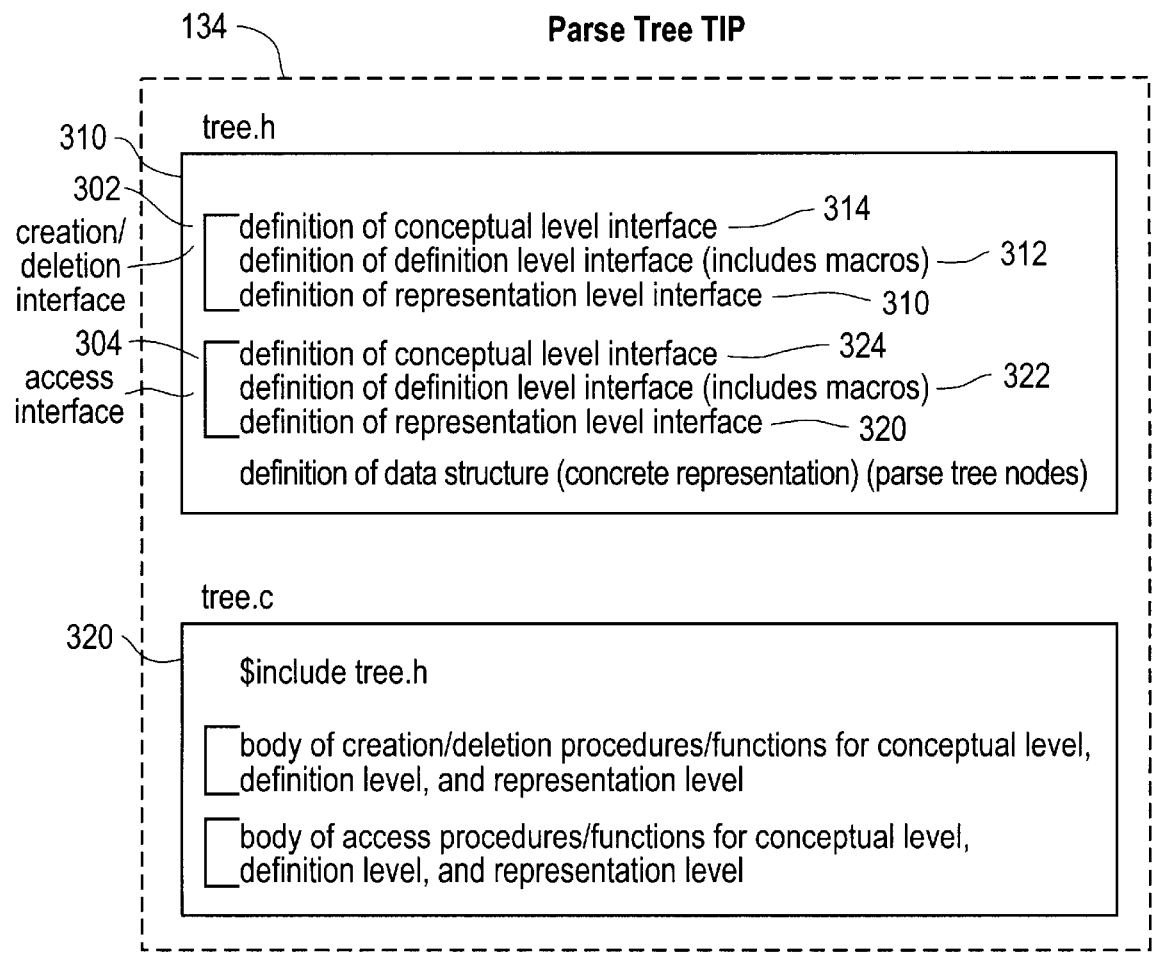
FIG. 3 shows an example of a TIP for a parse tree.

FIG. 3 shows an example of a TIP 134 for a parse tree. TIP 134 includes two files: a self-documented interface file (.h) 310 and an implementation file (.c) 320. Self-documented interface file 310 defines external procedures, functions, and variables, and macros (such as those making up the interfaces between the various TIP levels). (In a preferred implementation, most of the interface procedures and functions are defined as macros because their implementation is relatively small). Implementation file 320 contains the bodies of the procedures, functions and variables.

As shown in FIG. 3, the parse tree TIP 134 includes a "creation/deletion" interface 302 for each level and an "access" interface 304 for each level. In the described embodiment, parse tree TIP 134 does not include special definitions for update or output interfaces. The update interface for this TIP is used in the form of assignments whose left parts are calls of access interface macros. For example:

TR_TYPE(t)=p;

This fragment updates the TYPE attribute of the parse tree node t. An output interface for the parse tree is used for debugging purposes only, and is not included into most versions of the compiler to avoid increasing the size of the executable code. Other TIPs, of course, may include some or all of a creation/deletion interface, an access interface, an update interface, and an output interface, where each of these interfaces includes interface routines for each of the plurality of TIP levels.

As shown in FIG. 3, a creation/deletion interface exists for each of representation level 311, definition level 312, and conceptual level 314. In the described embodiment, the creation/deletion interfaces for the definition level 312 and conceptual level 314 are substantially identical. Similarly, an access interface exists for each of the representation level 320, the definition level 322, and the conceptual level 324. Note that, in the described embodiment, the access interfaces for both definition level 322 and conceptual level 324 are accessible to software outside of TIP 134. If necessary, some separate routines of the definition level can be made inaccessible from outside by declaring them as STATIC.

The creation/deletion interface for the conceptual level may include some general operations which create or delete the abstract object as a whole. For the given example, such operations are not necessary because there is only one parse tree, which is created implicitly as a result of some declarations and which is not explicitly deleted. If there were several such trees, it would be necessary to define abstract concept level operations of creating/deleting them (which are often referred to as constructors/destructors).

The creation/deletion interface for the definition level includes a plurality of definitions used to create and delete parse tree nodes. There are essentially an unlimited number of definitions that could be included in the definition level and it is not practical to discuss each herein. Several examples are provided below.

As an example, a procedure "tree_asgn" in TIP 134 creates a parse tree node that holds information about "assignment" statements (e.g., a node for a subtree representing "V:=E"). The procedure tree_asgn inputs a plurality of parameters, creates a new tree node (by accessing a "creation" procedure of the "representation" level), and stores the parameters into the newly created node. In a preferred embodiment, different nodes in the parse tree have different structures. Thus, each kind of node that can be contained in the parse tree is created and assigned values using a corresponding one of a plurality of node creation routines within the definition level of the creation/deletion interface for TIP 134.

The creation/deletion interface for the representation level of TIP 134 includes a routine to create a node of the needed structure and return a pointer to the newly created node. As discussed above, this routine is called by the definition level creation/deletion interface. In the example, there is no representation-level routine for deletion. The routine tr_free( ) frees tree storage for the whole tree, so it can be regarded as an example of a specific conceptual level deletion interface.

Thus, the creation/deletion interface of TIP 134 contains a plurality of abstract levels, which include an encapsulated concrete representation, a representation level, a definition level, and a conceptual level. The creation/deletion interface to TIP 134 consists of the conceptual level and a portion of the definition level. The concrete representation and representation level are hidden from the computer programmer.

The access interface for the conceptual level of TIP 134 includes an iterator function that allows access to list elements in a node of the tree. This is the only conceptual level interface in this example. Access to tree nodes and their attributes is performed by definition level access operations.

The access interface for the definition level includes a plurality of definitions (e.g., macro definitions) used to access the parse tree. There are essentially an unlimited number of definitions that could be included in the definition level and it is not practical to discuss each herein. Several examples are provided below.

The access interface for the definition level might contain, for example, the following macro definitions in the C programming language:

define TR_ASG_LHS(t) /* left part of an assignment node */ \ ((t)->tree_ele.t_asg_node.lhs_var)

define TR_VAR_ID(t) /* the identifier of the variable */ \ ((t)- >tree_ele.t_var_node.cptr)

Using these definition of TIP 134, a software program can access an identifier (e.g., "V") of a left-hand part of an assignment parse tree node (e.g., V:=E) simply by using the defined interfaces TR_ASG_LHS and TR_VAR_ID, which are defined with in the definition level of the parse tree TIP 134, as follows:

TR_VAR_ID(TR_ASG_LHS(T))

The structure of the parse tree and the pointer accesses are hidden by TIP 134.

As a second example, the access interface of a definition level for a TIP corresponding to the NL table (in the TIP for the NL table) might contain the following macro definitions in the C programming language:

define NL_GLOBAL(np) /* test if a variable is global */ \ (((np)->extra_flags) & NGLOBAL) !=0)

define NL_STATIC(np) /* test if a variable is static */ \ (((np)->extra_flags) & NSTATIC) !=0)

Using these definitions of a TIP for the NL table (symbol table), a software program could check the status of variables within the NL table to determine their status simply by using the defined interfaces NL_GLOBAL and NL_STATIC as follows:

if (NL_GLOBAL(np) || NL_STATIC(np))

The pointer accesses and bitwise AND operations are hidden within the TIP for the NL table.

The representation level access routines for TIP 134 include, e.g., a routine (tr_alloc(n)) to allocate a tree node of n bytes.

Thus, the access interface of TIP 134 contains a plurality of abstract levels, which include an encapsulated concrete representation, a representation level, a definition level, and a conceptual level. The public access interface to TIP 134 consists of the conceptual level and a portion of the definition level. The concrete representation and representation level are hidden from the computer programmer.

In summary, while using the present invention, software is written under a strict discipline that enables readability, reliability, and maintainability of the software. Using the present invention, "risky" fragments using pointers, flags, indirect addressing, etc. are written only once, within the appropriate TIP at the definition level. Each type of interface of a TIP (e.g., creation/deletion, access, update, and output interfaces) contains a plurality of abstract levels, which include an encapsulated concrete representation, a representation level, a definition level, and a conceptual level. Each interface to a TIP consists of the conceptual level and (maybe) a portion of the definition level. The concrete representation and representation level are hidden from the computer programmer.

Other embodiments of the present invention will be apparent to those skilled in the art from consideration of the specification and practice of the invention disclosed herein. For example, other embodiments of the present invention may use different names for the levels and interfaces described herein.

It will be understood by a person of ordinary skill in the art that TIP technology is a methodology and structure for writing software computer programs. Thus, TIP technology attains its goals best if its various levels and interfaces are scrupulously defined and maintained. It will be understood, however, that partial use of TIP technology will also yield benefits in readability and maintainability, although such benefits are not necessarily at the level achieved when TIP technology is strictly observed. Thus, use of TIP technology is not "all or nothing" and it is possible to write a computer program that uses TIP technology in some parts, but not in others.

It is intended that the specification and examples be considered as exemplary only, with a true scope of the invention being indicated by the following claims.

What is claimed is:

1. A method of converting source code into object code, comprising the steps, performed by a data processing system having a memory, of:

providing, in the memory, a TIP that corresponds to a data structure in the memory, the data structure chosen from a group consisting of an identifier table data structure, a name list (NL) table data structure, a parse tree data structure, and a data structure representing a conventional grammar of a programming language, the TIP including at least one programming interface to the data structure, the programming interface chosen from a group consisting of a creation/deletion interface, an access interface, an update interface and an output interface, the at least one programming interface comprising a plurality of abstract interface levels including a representation level containing an interface to the data structure, the representation level for defining access to attributes and elements in the data structure, a definition level containing an interface to the representation level, the definition for defining access to abstract attributes in the representation level, and a conceptual level containing an interface to the definition level, the conceptual level for treating the data structure as a single abstract object, the conceptual level interface having a plurality of software procedures through which the TIP can be accessed by software outside the TIP, at least the data structure and the representation level not being accessible from outside the TIP, the conceptual level being accessible from outside the TIP and the definition level enabling at least one unique interface; and performing an operation on the data structure, as part of the conversion from source code into object code, by way of the conceptual level of the interface, which in turn accesses the representation level, which in turn accesses the data structure.

2. The method of claim 1, wherein the programming language is the pascal programming language.

3. The method of claim 1, further including the step of:

providing in the memory a second TIP that corresponds to a second data structure chosen from the group consisting of the identifier table data structure, the name list (NL) table data structure, the parse tree data structure, and the data structure representing a conventional grammar of a programming language, the second TIP including at least one interface to the second data structure, the interface chosen from a group consisting of a creation/deletion interface, an access interface, an update interface, and an output interface, the at least one interface to the second data structure including a plurality of abstract interface levels, which include a second representation level containing an interface to the second data structure, a second definition level containing an interface to the second representation level, and a second conceptual level, containing an interface to the second definition level, where at least the second data structure and the second representation level cannot be accessed from outside of the second TIP and where the second conceptual level of interface can be accessed from outside the second TIP.

4. The method of claim 1, wherein the operation performing step further includes the step of performing operations on the data structure by way of the conceptual level of the interface, which in turn accesses the definition interface, which in turn accesses the representation level, which in turn accesses the data structure.

5. The method of claim 1, wherein a level N+1 interface can be accessed by a level N interface only.

6. A method used in a computer program that converts source code into object code, comprising the steps, performed by a data processing system having a memory, of:

providing, in the memory, a TIP that corresponds to a data structure in the memory that is used by the computer program, the TIP including at least one interface to the data structure, the interface chosen from a group consisting of a creation/deletion interface, an access interface, an update interface and an output interface, the at least one interface comprising a plurality of abstract interface levels including a representation level containing an interface to the data structure, the representation level for defining access to attributes and elements in the data structure, a definition level containing an interface to the representation level, the definition level for defining access to abstract attributes in the representation level, and a conceptual level containing an interface to the definition level, the conceptual level for treating the data structure as a single abstract object, the conceptual level interface having a plurality of software procedures through which the TIP can be accessed by software outside the TIP, at least the data structure and the representation level of the interface being inaccessible from outside the TIP, the conceptual level of the interface being accessible from outside the TIP and the definition level enabling at least one unique interface; and performing an operation on the data structure, as part of the conversion from source code to object code, by way of the conceptual level of the interface, which in turn accesses the representation level, which in turn accesses the data structure.

7. An apparatus that uses a compiler computer program to convert source code into object code, comprising:

a data processing system having a memory provided to store at least one data structure used by the computer program, the at least one data structure chosen from a group consisting of an identifier table data structure, a name list (NL) table data structure, a parse tree data structure and a data structure representing a conventional grammar of a programming language;

a TIP that corresponds to the stored data structure;

an interface portion in the TIP providing at least one interface to the data structure, the interface chosen from a group consisting of a creation/deletion interface, an access interface, an update interface, and an output interface;

a plurality of abstract interface levels provided in the interface portion of the TIP, the abstract interface levels including a representation level containing an interface to the data structure, the representation level for defining access to attributes and elements in the data structure, a definition level containing an interface to the representation level, the definition level for defining access to abstract attributes in the representation level, and a conceptual level containing an interface to the definition level, the conceptual level for treating the data structure as a single abstract object, the conceptual level interface having a plurality of software procedures through which the TIP can be accessed by software outside the TIP, at least the data structure and the representation level of the interface being inaccessible from outside the TIP, the conceptual level of the interface being accessible from outside the TIP and the definition level enabling at least one unique interface; and an operation performing portion of the data processing system that performs at least one instruction of the computer program, provided to perform an operation on the data structure as part of the conversion from source code to object code, by way of the conceptual level of the interface, which in turn accesses the representation level, which in turn accesses the data structure.

8. The apparatus of claim 7, wherein the programming language is the pascal programming language.

9. The apparatus of claim 7, further including:

a second data structure stored in the memory and chosen from the group consisting of the identifier table data structure, the name list (NL) table data structure, the parse tree data structure, and the data structure representing a conventional grammar of a programming language;

a second TIP that corresponds to the second data structure;

an interface portion in the second TIP providing at least one interface to the second data structure, the interface chosen from a group consisting of a creation/deletion interface, an access interface, an update interface, and an output interface;

a plurality of abstract interface levels for the interface portion of the second TIP, the abstract interface levels including a representation level containing an interface to the data structure, a definition level containing an interface to the representation level, and a conceptual level, containing an interface to the definition level, where at least the data structure and the representation level of the interface cannot be accessed from outside of the TIP and the conceptual level of the interface can be accessed from outside the TIP; and wherein the operation performing portion includes a portion that performs at least one instruction of the computer program to perform an operation on the second data structure by way of the conceptual level of the interface of the second TIP, which in turn accesses the representation level of the second TIP, which in turn accesses the second data structure.

10. The apparatus of claim 7, wherein the operation performing portion further includes a portion provided to perform an operation on the data structure by way of the conceptual level of the interface, which in turn accesses the definition interface, which in turn accesses the representation level, which in turn accesses the data structure.

11. The apparatus of claim 7, wherein a level N+1 interface can be accessed by a level N interface only.

12. The method of claim 6, wherein the programming language is the pascal programming language.

13. The method of claim 6, further including the steps of:

providing in the memory a second TIP that corresponds to a second data structure chosen from the group consisting of the identifier table data structure, the name list (NL) table data structure, the parse tree data structure, and the data structure representing a conventional grammar of a programming language, the second TIP including at least one interface to the second data structure, the interface chosen from a group consisting of a creation/deletion interface, an access interface, an update interface, and an output interface, the at least one interface to the second data structure including a plurality of abstract interface levels, which include a second representation level containing an interface to the second data structure, a second definition level containing an interface to the second representation level, and a second conceptual level, containing an interface to the second definition level, where at least the second data structure and the second representation level cannot be accessed from outside of the second TIP and where the second conceptual level of the interface can be accessed from outside the second TIP.

14. The method of claim 6, wherein the operation performing step further includes the step of performing operations on the data structure by way of the conceptual level of the interface, which in turn accesses the definition interface, which in turn accesses the representation level, which in turn accesses the data structure.

15. The method of claim 6, wherein a level N+1 interface can be accessed by a level N interface only.

16. A computer readable medium carrying one or more sequences of instructions for converting source code into object code, wherein execution of the one or more sequences of instructions by one or more processors causes the one or more processors to perform the steps of:

accessing a TIP that corresponds to a data structure created and stored in a memory, the data structure chosen from a group consisting of an identifier table data structure, a name list (NL) table data structure, a parse tree data structure and a data structure representing a conventional grammar of a programming language, the TIP including at least one interface to the data structure, the interface chosen from a group consisting of a creation/deletion interface, an access interface, an update interface and an output interface, the at least one interface comprising a plurality of abstract interface levels including a representation level containing an interface to the data structure, the representation level for defining access to attributes and elements in the data structure, a definition level containing an interface to the representation level, the definition level for defining access to abstract attributes in the representation level, and a conceptual level containing an interface to the definition level, the conceptual level for treating the data structure as a single abstract object, the conceptual level interface having a plurality of software procedures through which the TIP can be accessed by software outside the TIP, at least the data structure and the representation level of the interface being inaccessible from outside of the TIP, the conceptual level of the interface being accessible from outside the TIP and the definition level enabling at least one unique interface; and performing an operation on the data structure, as part of the conversion from source code to object code by way of the conceptual level of the interface, which in turn accesses the representation level, which in turn accesses the data structure.

17. A computer readable medium carrying one or more sequences of instructions for converting source code into object code, wherein execution of the one or more sequences of instructions by one or more processors causes the one or more processors to perform the steps of:

accessing a TIP that corresponds to a data structure created and stored in a memory that is used by the one or more sequences of instructions, the TIP including at least one interface to the data structure, the interface chosen from a group consisting of a creation/deletion interface, an access interface, an update interface and an output interface, the at least one interface comprising a plurality of abstract interface levels including a representation level containing an interface to the data structure, the representation level for defining access to attributes and elements in the data structure, a definition level containing an interface to the representation level, the definition level for defining access to abstract attributes in the representation level, and a conceptual level containing an interface to the definition level, the conceptual level for treating the data structure as a single abstract object, the conceptual level interface having a plurality of software procedures through which the TIP can be accessed by software outside the TIP, at least the data structure and the representation level of the interface being inaccessible from outside of the TIP, the conceptual level of the interface being accessible from outside the TIP, and the definition level enabling at least one unique interface; and performing an operation on the data structure, as part of the conversion from source code to object code by way of the conceptual level of the interface, which in turn accesses the representation level, which in turn accesses the data structure.

18. A computer program product comprising:

a computer usable medium having computer readable code embodied therein for causing source code to be converted into object code, the computer program product including:

computer readable program code devices configured to cause a computer to access from a memory at least one data structure to be used by the computer program product, the at least one data being chosen from a group consisting of an identifier table data structure, a name list (NL) table data structure, a parse tree data structure and a data structure representing a conventional grammar of a programming language;

computer readable program code devices configured to cause a computer to effect accessing a TIP that corresponds to the at least one data structure, the TIP including an interface portion providing at least one interface to the data structure, the interface chosen from a group consisting of a creation/deletion interface, an access interface, an update interface, and an output interface, a plurality of abstract interface levels being provided in the interface portion of the TIP, the abstract interface levels including a representation level containing an interface to the data structure, the representation level for defining access to attributes and elements in the data structure, a definition level containing an interface to the representation level, the definition level for defining access to abstract attributes in the representation level, and a conceptual level, containing an interface to the definition level, the conceptual level for treating the data structure as a single abstract object, the conceptual level interface having a plurality of software procedures through which the TIP can be accessed by software outside the TIP, at least the data structure and the representation level being inaccessible from outside the TIP, the conceptual level of the interface can be accessed from outside the TIP, and the definition level enabling at least one unique interface; and computer readable program code devices configured to cause a computer to effect performing, as part of the conversion from source code to object code, an operation on the data structure by way of the conceptual level of the interface, which in turn accesses the representation level, which in turn accesses the data structure.

19. A method of converting source code into object code, comprising the steps, performed by a data processing system having a memory, of:

providing, in the memory, a TIP that corresponds to a data structure in the memory, the data structure chosen from a group consisting of an identifier table data structure, a name list (NL) table data structure, a parse tree data structure, and a data structure representing a conventional grammar of a programming language, the TIP including at least one programming interface to the data structure, the programming interface chosen from a group consisting of a creation/deletion interface, an access interface, an update interface and an output interface, the at least one programming interface comprising a plurality of abstract interface levels including a representation level containing an interface to the data structure, the representation level for defining access to attributes and elements in the data structure, a definition level containing an interface to the representation level, the definition level for defining access to abstract attributes in the representation level, and a conceptual level containing an interface to the definition level, the conceptual level for treating the data structure as a single abstract object, the conceptual level interface having a plurality of software procedures through which the TIP can be accessed by software outside the TIP, at least the data structure and the representation level being inaccessible from outside the TIP, the conceptual level being accessible from outside the TIP and the TIP enabling at least one aspect of the definition level to be made inaccessible from outside the TIP by declaring the at least one aspect as static; and performing an operation on the data structure, as part of the conversion from source code into object code, by way of the conceptual level of the interface, which in turn accesses the representation level, which in turn accesses the data structure.

20. A method of converting source code into object code, comprising the steps, performed by a data processing system having a memory, of:

providing, in the memory, a TIP that corresponds to a data structure in the memory, the data structure chosen from a group consisting of an identifier table data structure, a name list (NL) table data structure, a parse tree data structure, and a data structure representing a conventional grammar of a programming language, the TIP including at least one programming interface to the data structure, the programming interface chosen from a group consisting of a creation/deletion interface, an access interface, an update interface and an output interface, the at least one programming interface comprising a plurality of abstract interface levels including a representation level containing an interface to the data structure, the representation level for defining access to attributes and elements in the data structure, a definition level containing an interface to the representation level, the definition level for defining access to abstract attributes in the representation level, and a conceptual level containing an interface to the definition level, the conceptual level for treating the data structure as a single abstract object, the conceptual level interface having a plurality of software procedures through which the TIP can be accessed by software outside the TIP, at least the data structure and the representation level being inaccessible from outside the TIP, the conceptual level being accessible from outside the TIP and the TIP enabling at least one risky aspect of the definition level to be written only once despite variation of the interface of at least one other level; and performing an operation on the data structure, as part of the conversion from source code into object code, by way of the conceptual level of the interface, which in turn accesses the representation level, which in turn accesses the data structure.

21. The method of claim 1, wherein the conceptual level interface includes an iterator function to allow access to list elements in a node of a tree.

* * * * *